INVENTOR.
WARD HARRISON

Patented Jan. 12, 1954

2,665,610

UNITED STATES PATENT OFFICE 2,665,610

LIGHT DIRECTING GLASS BLOCK

Ward Harrison, Shaker Heights, Ohio, assignor to Holophane Company, Inc., New York, N. Y., a corporation of Delaware Application November 10, 1949, Serial No. 126,591

3 Claims. (Cl. 88—60)

This invention relates to improvements in glass blocks, and has to do more particularly with hollow glass blocks of the type in which the sides of the block embody internal horizontal prismatic flutings for deflecting incident light in a manner to cause the major part of the light to be directed through the block and then upwardly toward the ceiling of a room in an outer wall of which the blocks are incorporated. Light redirecting glass blocks of this type, used in building construction to form the outside wall of a room, have been developed to a point where they accept most of the light which strikes them in a downwardly inclined direction and redirect it inwardly and upwardly so that it strikes the ceiling of the room and is thus dispersed over substantially the entire area of the interior. The redirection of light upwardly under some conditions of installation or use is accompanied by relatively high brightness of the inner wall surface in normal direction of view, which becomes objectionable.

It is a characteristic of a prismatic glass block that a minor portion of the light passing through it fails to follow the desired direction but is transmitted into the room in directions which are quite undesirable from the glare standpoint. The intensity of such rays is substantially less than those directed upward but is still sufficient to cause serious ocular discomfort to the occupants of the room.

Attempts have been made to overcome this difficulty by incorporating devices internally of the block. Such devices have not been feasible from the manufacturing standpoint, and furthermore they are necessarily not completely effective since they affect only the light transmitted by the outer side of the block. Other devices supported independently, such as Venetian blinds, are objectionable because of the rapid accumulation of dust and dirt upon them. The present invention realizes the advantages of the latter devices without incurring the disadvantages heretofore encountered in their use.

The object of the invention therefore is the provision of a hollow glass block of the type which receives light at a downwardly inclined angle, directs it through the block and then upwardly toward the ceiling of the room, which block shall have incorporated on the room surface of its inner side a screen which shall prevent the passage into the room of any stray light that would tend to cause glare or ocular discomfort to the room's occupants.

Figure 1:
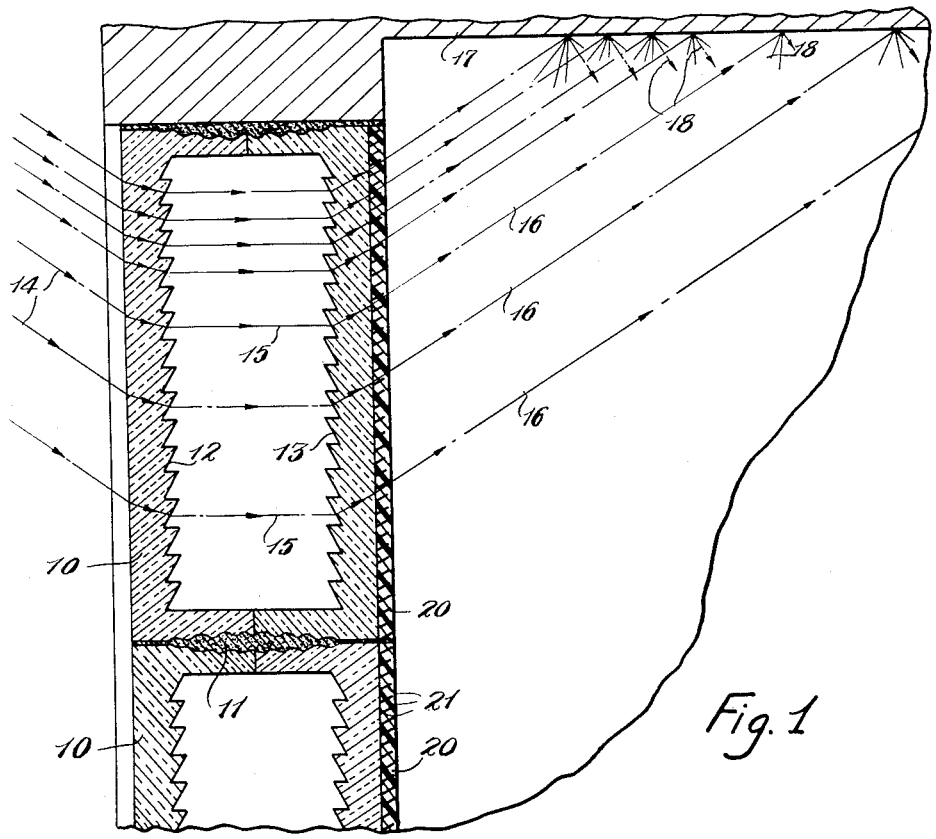

In the drawing Fig. 1 is a fragmental vertical sectional view of a room, an outer wall of which is built up of blocks constructed according to the invention.

Figure 2:
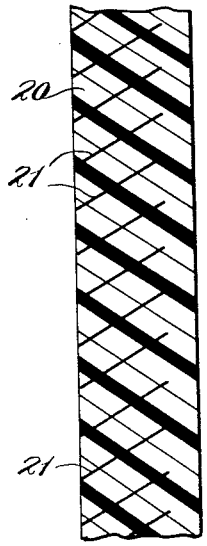

Fig. 2 is a fragmental vertical sectional view on a magnified scale of a louver plate which may be cemented to, embedded within or otherwise secured to the inner side of the block.

A portion of the outer wall of a room is shown in the drawing as composed of hollow glass blocks 10, the wall being built up by superposing these blocks one upon another and securing them together by cement 11. The interior surfaces of the side walls of each block are formed with prismatic fittings 12 and 13, such that the incident light rays 14 directed downwardly at an angle from the sky are deflected by refraction crosswise through the block, as indicated at 15, and then upwardly through the inner wall toward the ceiling of the room as indicated at 16. The ceiling 17 is finished to reflect and diffuse light effectively, as indicated at 18. Thus the interior of the room is lighted softly by indirect light.

The block as thus far described is a conventional commercial product. It is effective to redirect the major part of the incident light toward the ceiling of the room. In accordance with the present invention this block is used in combination with a light transmitting louver plate 20 which is mounted on the room face of the block. This plate may be formed either of glass or of clear plastic. In order that it may be thin and therefore light in weight and inexpensive the parallel louvers 21 are relatively closely spaced. They are narrow, being of the order of one-eighth inch or less in width. These louver plates may be cemented to the glass block, or they may be welded to it while the glass of the block is still heated and plastic. Any other feasible method of securing the plate to the block may be employed.

The present invention is not concerned with the method of manufacturing the louver plates. However it may be stated that one method involves making a pile of alternate layers of clear plastic sheets, one-sixteenth inch thick for example, and of very thin sheets of opaque or translucent plastic, of a thickness for example of the order of one one-hundredth inch, interposed between the sheets or layers of clear plastic. All of the layers are held together as a result of cement or pressure or both and a solid block is formed whose dimensions may be a foot or more on a side. The block is then sawed in a proper diagonal plane into thin sheets, which results in louver plates with inclined louvers. Another method which may be employed involves the use of a thin plate of clear or translucent plastic which is cut part way through its thickness by means of very thin diagonally inclined knives or saws. Each cut results in a roughened light reflecting surface which serves as a louver. A louver plate formed by the latter method is the plate illustrated in the drawing. Preferably the cut side of the plate should be placed against the glass block so as to prevent the entrance of dirt into the cuts. There is also a photographic process which may be used to produce parallel louvers in a plate of clear glass, and this with properly disposed and inclined louvers will also serve as a louver plate. It may be cemented or even fused onto the glass block.

The angle of the louvers should be the same approximately as the angle of the deflected rays 16, and the louvers should be spaced preferably closely enough so that the upper edge of each louver will be at least as high as the lower edge of the louver next above it. Thereby any stray components of light which may tend to leave the inner surface of the block proper in a horizontal direction will be intercepted, as well as those which tend to enter the room in a downwardly inclined direction.

It should be noted that the louver plates are placed on the room side of the glass blocks, and this location is essential to prevent glare since each set of prismatic flutings in the block will give rise to objectionable stray light and a louver placed between them for instance could only partially obviate the glare which the stray light causes. My louver plate is located so as to hold under control the light from both sets of prisms, avoiding glare.

In the broader aspects of the invention it is not essential that the louver plates be separately constructed and cemented or otherwise fastened to the blocks. On the contrary the louvers may be mounted in the block itself, that is the side of the block which faces the room. This may be effected for example by inserting metallic louvers flush into the surface of the block while the latter is still in a plastic state. In such a construction the louvers are always on the room side of both sets of prismatic flutings.

In all of the constructions described the louvers are so enclosed that dust and dirt cannot collect upon them nor invade the space between them and the block proper. In the case of separately constructed louver plates the louvers are entirely enclosed within the plate and the joint between the plate and glass block is sealed all around.

Having thus described my invention, I claim:

1. A building wall for transmitting downwardly directed natural light into a room upwardly for indirect lighting from the ceiling of the room and having low brightness in generally horizontal directions when viewed from the interior of the room, the wall comprising, in combination, two light controlling components, one in the form of prismatic glass blocks having light redirecting means which act on downwardly sloping incident light from the exterior to transmit it inwardly through the blocks and redirect the dominant transmitted light upwardly toward the ceiling at angles substantially above the horizontal and emit a minor portion of the transmitted light in regions near the horizontal, the second component being in the form of relatively thin louvered plates mounted on the inner faces of the blocks and including louvers which extend horizontally along the inner faces of the blocks, slope upwardly therefrom, are spaced from one another for the transmission of upwardly proceeding light and act on the lower angled light from the blocks falling thereon to obscure the block surface in generally horizontal directions.

2. The combination of claim 1, wherein the upper edge of each louver is at least as high as the lower edge of the next higher louver.

3. In combination, a prismatic glass block normally placed in the external wall of a building, the block having light redirecting means for acting on downwardly emitted natural light falling on its outer, normally external, surface, and transmitting the dominant light through its opposite, normally inner, surface in upwardly slanting directions and a minimum portion of the light in directions near the horizontal, and a light screening plate mounted on the inner surface of the block and having louvers which slope upwardly and inwardly away from the block and through which the upwardly directed light is transmitted, the louvers intercepting lower angle light from the block to obscure the block surface.

WARD HARRISON.

References Cited in the file of this patent

UNITED STATES PATENTS

| Number | Name | Date |
| --- | --- | --- |
| 1,811,946 | Le Bailly | June 30, 1931 |
| 2,179,863 | Rolph | Nov. 14, 1939 |
| 2,322,591 | Rapp | June 22, 1943 |
| 2,545,906 | Watkins | Mar. 20, 1951 |

OTHER REFERENCES

Pearson abstract of application, Serial No. 766,579, published in O. G., November 1, 1949, vol. 628, page 256.